United States Patent
Wang et al.

(10) Patent No.: US 9,493,159 B2
(45) Date of Patent: Nov. 15, 2016

(54) HIGH ASSURANCE LANE FUSION SYSTEM

(71) Applicant: GM GLOBAL TECHNOLOGY OPERATIONS LLC, Detroit, MI (US)

(72) Inventors: Shige Wang, Northville, MI (US); Shuqing Zeng, Sterling Heights, MI (US); Xiaofeng Song, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/540,350

(22) Filed: Nov. 13, 2014

(65) Prior Publication Data
US 2016/0137200 A1    May 19, 2016

(51) Int. Cl.
*B60W 30/12* (2006.01)
*B60W 50/02* (2012.01)

(52) U.S. Cl.
CPC .......... *B60W 30/12* (2013.01); *B60W 50/0225* (2013.01)

(58) Field of Classification Search
CPC .................................................... B60W 30/12
USPC ............................................................ 701/1
See application file for complete search history.

(56) References Cited

U.S. PATENT DOCUMENTS

| | | | | |
|---|---|---|---|---|
| 4,958,270 A | * | 9/1990 | McLaughlin | G05B 9/03 700/82 |
| 5,666,483 A | * | 9/1997 | McClary | G06F 11/183 701/4 |
| 9,195,232 B1 | * | 11/2015 | Egnor | G05D 1/0055 |
| 2012/0221168 A1 | * | 8/2012 | Zeng | G08G 1/09626 701/1 |

* cited by examiner

*Primary Examiner* — Anne M Antonucci

(57) ABSTRACT

A lane centering fusion system including a primary controller determining whether a vehicle is centered within a lane of travel. The primary controller includes a primary lane fusion unit for fusing lane sensed data for identifying a lane center position. A secondary controller determines whether a vehicle is centered within a lane of travel. The secondary controller includes a secondary lane fusion unit for fusing lane sensed data for identifying the lane center position. The primary controller and secondary controller are asynchronous controllers. A lane centering control unit maintains the vehicle centered within the lane of travel. The lane centering control unit utilizes fusion data output from the primary controller for maintaining lane centering control. The lane centering control unit utilizes fusion data output from the secondary controller in response to a detection of a fault with respect to the primary controller.

20 Claims, 6 Drawing Sheets

HIGH ASSURANCE LANE FUSION SYSTEM

BACKGROUND OF INVENTION

An embodiment relates to lane fusion systems.

Lane centering systems identifies a position of the vehicle within a lane of travel and may either provide that information to other systems to details of when the vehicle is departing a lane or may be utilized as part of a lane centering control system. Lane centering control systems utilize the lane centering information, such as lane geometry, to control the steering wheel so that the vehicle can maintain a position in the center of the lane. Typically a system utilizes a lane sensing system controller for obtaining data from one or more sources and providing an output to a lane centering control system or other vehicle system. If a fault occurs with the controller, then the lane centering system would need to be disabled due to inaccurate information or lack of information. While some systems could utilize a dual duplex design having a backup system that is symmetric, the backup up system would be susceptible to the same faults. Moreover, the dual duplex system would basically double the cost since the backup system would be identical to the primary system.

SUMMARY OF INVENTION

An advantage of an embodiment is a support infrastructure services utilizing an asymmetric architecture of a lane fusion sensing system utilizing two controllers for fusing lane sensing data from a plurality of sensing device and subsystems. The system utilizes a high performance system and a high assurance system which maintains a robust and accurate diagnostic information from at least one of the fusion systems. Should a fault be detected with respect to a primary controller, the secondary controller provides lane fusion data to a lane centering control system to assure that supporting and accurate data flow is maintained to the lane centering control system. The asymmetric architecture provides pattern-based fault monitoring, configurable data buffer size, and an automatic synchronized mode switch protocol between the controllers. The secondary controller utilizes a light weight lane fusion technique in comparison to the primary controller utilizing stored data from the primary controller for estimation. The asymmetric architectures allow for reduced complexity in the secondary controller, cost reduction, and assurance that the secondary controller does not carry the faults of the primary controller since a dual duplex controller design is not utilized.

An embodiment contemplates a lane centering fusion system including a primary controller determining whether a vehicle is centered within a lane of travel. The primary controller includes a primary lane fusion unit for fusing lane sensed data for identifying a lane center position. A secondary controller determines whether a vehicle is centered within a lane of travel. The secondary controller includes a secondary lane fusion unit for fusing lane sensed data for identifying the lane center position. The primary controller and secondary controller are asynchronous controllers. A lane centering control unit maintains the vehicle centered within the lane of travel. The lane centering control unit utilizes fusion data output from the primary controller for maintaining lane centering control. The lane centering control unit utilizes fusion data output from the secondary controller in response to a detection of a fault with respect to the primary controller.

DETAILED DESCRIPTION

Figure 1:
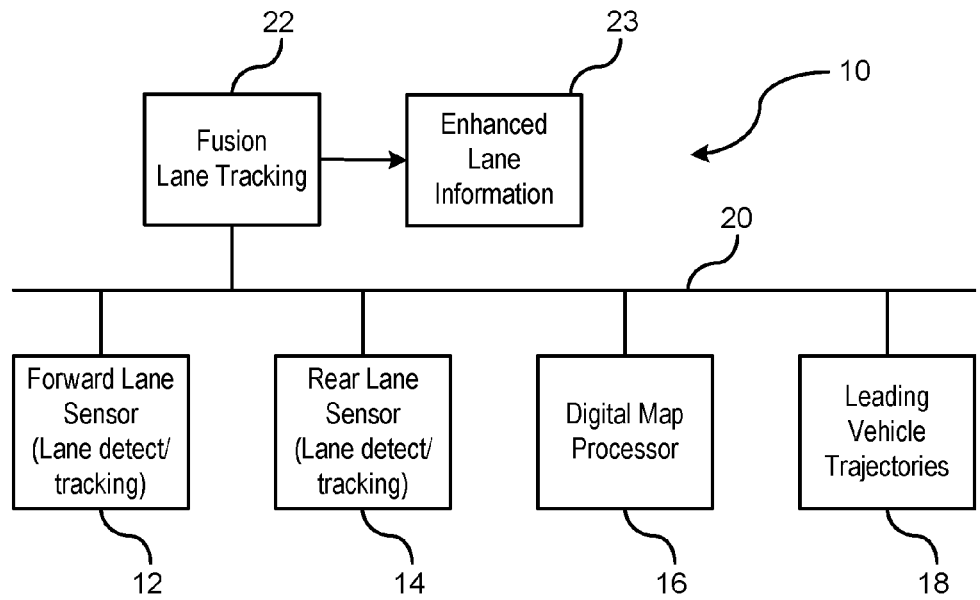
FIG. 1 is a block diagram for a lane fusion system.

FIG. 1 is a block diagram for a lane fusion system 10. The lane fusion system 10 includes a plurality of lane sensing subsystems 11 in which lane sensing data is obtained and cooperatively fused for enhanced lane tracking. The plurality of lane sensing systems include, but is not limited to, forward lane sensing systems 12, rear lane sensing systems 14, a digital map processor 16, and leading vehicle trajectories 18. Forward lane sensing systems 12 include systems that detect and track lane centering forward of the vehicle. Rear lane sensing systems 14 include systems that detect and track lane centering rearward of the vehicle. Digital map processors 16 perform GPS map matching, and lead vehicle trajectories 18 track the trajectories of the lead vehicle for comparison with a host vehicle path of travel.

The plurality of lane sensing systems transmits the data over a communication bus 20 to a lane fusion unit 22. The lane fusion unit 22 fuses the various results from the plurality of lane sensing systems 11. Lane fusion is a single point failure component for a lane centering control system and is typically computationally intensive. The fused results are then output to a lane centering control unit 23 which utilizes the result to maintain the vehicle within the lane of travel.

Figure 2:
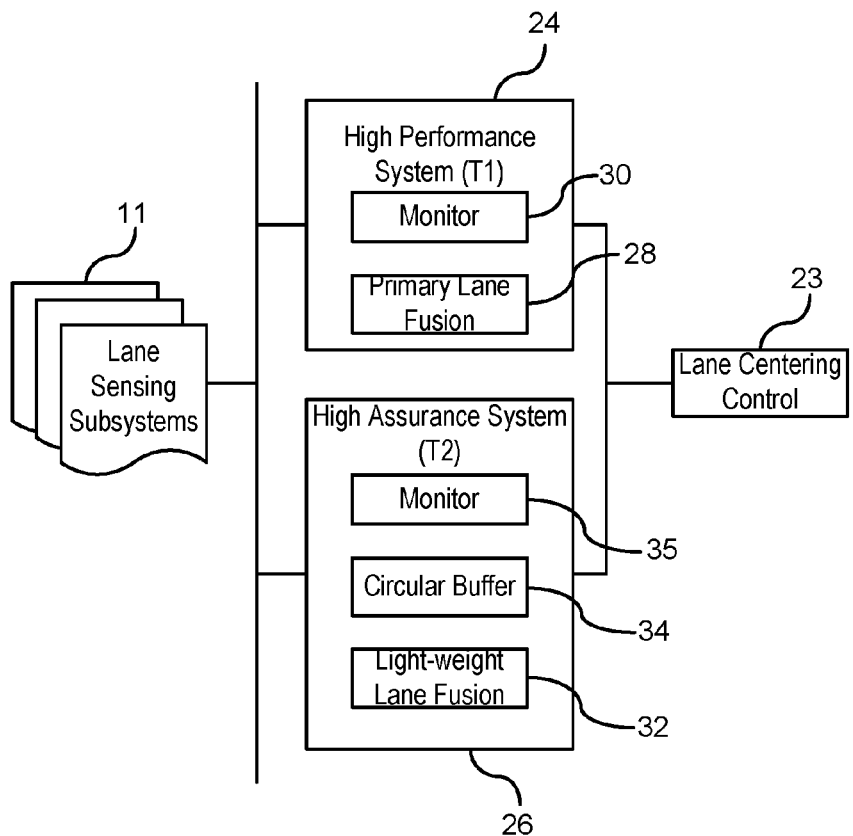
FIG. 2 is a block diagram illustrating asynchronous controllers in the lane fusion system.

FIG. 2 illustrates a block diagram of an embodiment of the invention utilizing a primary controller 24 and a secondary controller 26. The primary controller 24 operates as a performance controller having a computational intensive processor. The primary controller 24 includes a primary lane fusion module 28 that utilizes the information obtained from the plurality of lane sensing subsystems 11 for identifying an enhanced position within the lane of travel. It should be understood that the primary controller 24 is not limited to obtaining information from the lane sensing subsystems 11 as described above, but may utilize additional information from other lane sensing systems.

The primary controller 24 further includes a monitoring module 30 for monitoring the operation and integrity of the primary controller 24 and the algorithms run by the primary fusion module 28. Examples of the monitoring module 30 may include but is not limited to Probability Integrity and Security Module and a Main Processor Monitoring Module. The primary objective of the monitoring module 30 is to identify functional integrity check results and determine whether the primary controller 24 and associated algorithm is operating without fault. If the primary controller 24 is operating without fault, then the lane centering control unit 23 will utilize data only from the primary controller 24.

The secondary controller 26 includes a light weight lane fusion module 32 operating as a high assurance system. The term lightweight as used herein refers to a system that is less computationally intensive in contrast to the primary controller 24. Moreover, the secondary controller 26 maintains increased assurance of data integrity and accuracy based on the data utilized in making its determinations. The secondary controller 26 includes a buffer 34 for storing outputs of the primary controller 26 over a predefined duration of time (e.g., 5 seconds). The buffer 34 is preferably a circular buffer which will be described in detail later.

The secondary controller 26 further includes a monitoring module 35 for monitoring the operation, functionality, and integrity of the primary controller 24. The monitoring module 35 performs functional integrity check results for determining whether the primary controller 24 is operating without fault. The monitoring module 35 may utilize existing vehicle modules such as probability integrity and security module and a main processor monitoring module. If the primary controller 24 is operating without fault, then the lane centering control unit 23 will utilize data only from the primary controller 24. If the secondary controller 26 is in the active state, then the output from the secondary controller 26 takes precedent over the output from the primary controller 24. The monitoring module 35 further monitors functionality of the primary controller 26 to maintain synchronization with the primary controller 24, so that both controllers are identifying the same lane characteristics (e.g., road shape, length, curvature, geometry), and in the event a fault occurs with respect to the primary controller 24, the secondary controller 26 can immediately be enabled for identifying and analyzing the exact location of the vehicle within the lane of travel when the fault is detected with the primary controller 24. As a result, the secondary controller will be able to seamlessly continue lane centering functionality for the vehicle.

It should be understood that the primary controller 24 and the secondary controller 26 may be part of a single controller having a multi-core structure where the controller runs different processes and one core of the controller does not affect the other core.

The primary controller 24 and the secondary controller 26 have asymmetric architectures so that each can run independently of one another and not carry the same faults. When the primary controller 24 is detected as faulty, the secondary controller 26, which is running in passive mode, switches to active mode and starts transmitting data to the lane centering control unit 23. The secondary controller 26 utilizes buffered data from the primary controller 24 and also data from the plurality of lane sensing subsystems for generating lane centering information for the lane centering control unit 23. If the primary controller 24 resets and is operating with no faults, then the secondary controller 26 will reenter a passive mode of operation and will terminate transmitting data to the lane centering control unit 23. The primary controller 24 thereafter transmits data to the lane centering control unit 23, which in turn, will make adjustments to the vehicle steering or other vehicle controls, if needed.

Figure 3:
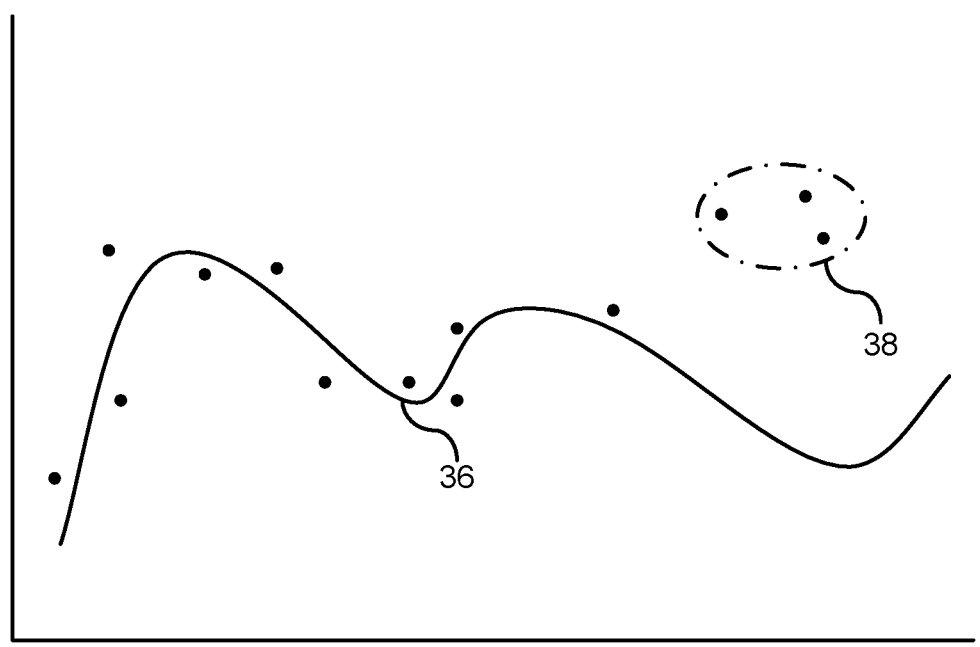
FIG. 3 illustrates a pattern fit comparator graph for detecting error in the sensed data.

To enable switching between the primary controller and the secondary controller, a functional integrity check is performed to determine whether the primary function of the primary controller has failed. This can be performed utilizing a pattern fit comparator. The pattern fit comparator compares current sense data with historical data to predict a correct value range. Typically, values do not change abruptly beyond a respective range, and therefore a functional failure can be inferred by abrupt changes in the pattern. In FIG. 3, the line represented by 36 represents an expected pattern. The respective data points 38 are computed values. As shown in FIG. 3, a set of values deviate beyond a range of the expected pattern, and therefore, are considered faulty values. As a result, a primary function failure is identified utilizing the functional integrity check when the pattern fit comparator identifies values that exceed a range of the expected pattern.

An advantage of the asymmetric architecture is lower processing costs in contrast to a dual duplex design. In addition, duplicate software design faults are not present since the implementation is asymmetric and the secondary controller 26 will not carry forward the host software design faults of the primary controller 26.

Faults that may be detected in the controller include functional integrity faults. This includes faults relating to functionality where the system can analyze the data and determine by arbitration whether a functional fault is present. The other types of faults are controller faults or processor faults. This may be determined by monitoring health messages within the system. Typically, nodes of the system communicate with one another by supplying heartbeat messages that provide status information relating to a node. In the event a node that typically transmits a message at a predetermined rate is no longer transmitting a message, then a determination is made that no data is being transmitted and a controller fault or processor fault is present.

Figure 4:
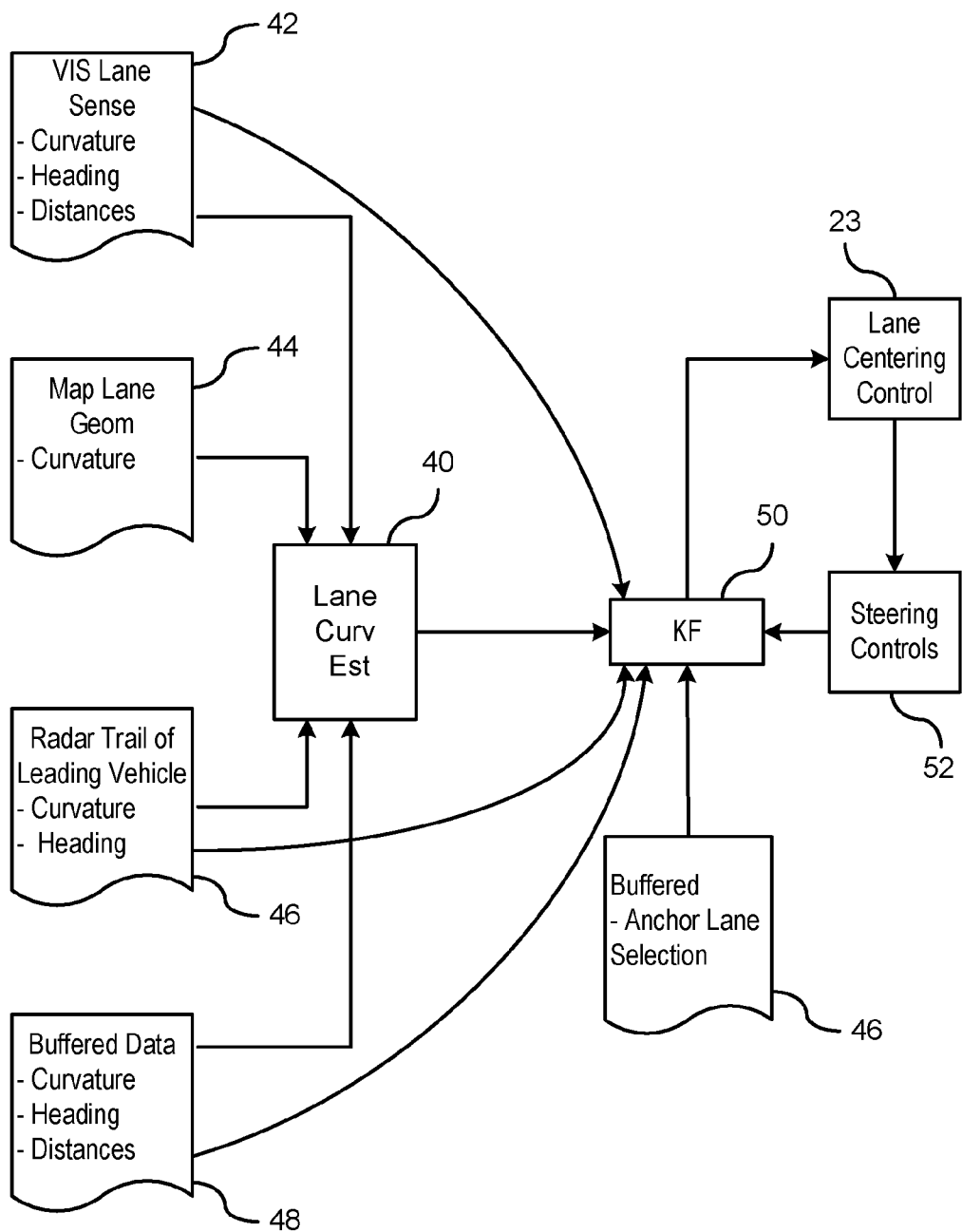
FIG. 4 is a flow diagram illustrating a light weight futons technique performed by the secondary controller.

FIG. 4 is a block diagram illustrating a light weight lane fusion technique performed by the secondary controller. A lane curvature estimation processor module 40 receives lane curvature input from various sources that include, but are not limited to, visual lane sensing devices 42, map lane geometry devices 44, radar trail of the leading car 46, and buffered data 48.

The visual lane sensing devices 42 provide data such as curvature data, heading data, and distance data. The map lane geometry devices 44 provide curvature data from existing map information. The radar trail data 46 provides curvature data and heading data based on the tracking of the leading car. Buffered data 48 is obtained from the primary controller and includes curvature data, heading data, and distance data.

The input data received from each of the data sources are input to the lane curvature estimation processor module 40 and are weighted. Weighting factors are applied to each respective set of input data from the various input sources. The weighting factors are predetermined. This allows the system to provide greater emphasis on those respective input sources that should be relied on during lane fusion. A formula representing the fused lane curvature $c_0$ is represented as follows:

$$c_0 = \alpha c_V + \beta c_M + \gamma c_R + \delta C_B$$

where $c_V$ is the curvature based on vision lane sensing data, $c_M$ is the curvature based on the map lane geometry data, $c_R$ is the curvature based on radar trail data, $c_B$ is the curvature based on buffered data, and $\alpha$, $\beta$, $\gamma$, $\delta$ are weight factors.

The weighted lane curvature is output where the weighted average is determined for the fused lane curvature of the input sources and is applied to a Kalman filter tracker 50. The Kalman filter tracker 50 utilizes a series of measurements that are observed over time. The state variables are the vehicle's ground location and velocity, in addition to the leading vehicle's location and velocity. As a result, the location, the moving direction, and the trajectory of the vehicle is updated using the Kalman filtering. This technique also attempts to "anticipate" the vehicle's intention to travel in a respective lane of travel.

After applying the Kalman filter 50 to the fused lane curvature data, the adjusted output is then provided to the lane centering control unit 23. The adjusted output includes the fused lane curvature $c_0$, an angle offset from the center of the lane $\phi$, and the distance offset from the center of the lane $\gamma$. The distance offset may include a left offset from the center and a right offset from the center.

The lane centering control unit 23 receives the adjusted output from the Kalman filter 50 and enables vehicle operating controls 52 (e.g., steering controls) for maintaining the vehicle in the center of the lane. In addition, vehicular speed $v_H$, and yaw rate $\omega_H$ are fed back to the Kalman filter 50 for adjusting the fused lane curvature $c_0$ generated by the lane curvature estimation processor module 40.

In addition, an anchor lane selection unit 54, which is buffered from the primary controller, may be input to the Kalman filter tracker 50. Data from the anchor lane selection unit 44 may be utilized in instances where an exit ramp is present and the lane markings of the exit ramp deviate from the current road of travel. In this scenario, the lane markings of the current road of travel will not be parallel to the lane markings of the exit ramp. Under such circumstances, a respective lane marker is identified as the anchor for lane centering so that the routine makes the proper decision to follow the identified lane marker.

Figure 5:
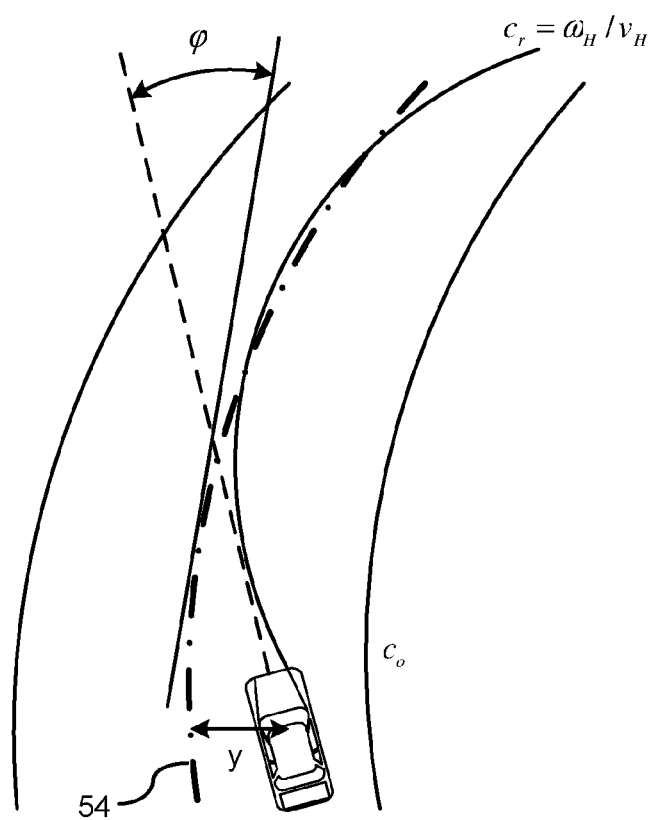
FIG. 5 is an illustration identifying parameters used by the Kalman filter.

FIG. 5 illustrates an example of parameters utilized by the Kalman filtering process for lateral state tracking. The vehicle's lateral state is estimated by modeling the vehicle's motion with respect to the lane center 56. Buffered anchor data from the anchor lane selection unit 54 temporarily stored from the primary controller is used as the system transitions lane fusion from the primary controller to the secondary controller. Buffered anchor data includes the latest estimated state variables (i.e., the fused curvature $c_0$, angle offset between the center of the lane and a heading direction of the vehicle $\phi$, lateral offset between a longitudinal centerline of the vehicle and the center of the lane $\gamma$) from the lane tracker from primary controller. These signals are typically added. Upon transitioning to the secondary controller, the Kalman filter tracker is enabled. The Kalman filter tracker utilizes the following state equations:

$$\gamma' = \gamma + v\phi\Delta T + v_{H\gamma}\Delta T$$

$$\phi' = \phi + (c_{veh} - c_0)v\Delta T$$

where $\gamma$ is a lateral offset between a longitudinal centerline of the vehicle and the center of the lane, $v_{H\gamma}$ is a host lateral speed estimated from vehicle dynamic data, $\phi$ is an angle offset between the center of the lane and a heading direction of the vehicle, $c_0$ is the fused lane curvature, and $c_{veh}$ is a curvature of the predicted vehicle path determined as a function of both vehicular speed $v_H$ and yaw rate $\omega_H$ and is represented by the following equation:

$$c_{veh} = \omega_H / v_H.$$

A measurement equation can then be applied utilizing anchor lane information. The following conditions are utilized when determining the anchor lane parameters:

$$y_v = \begin{cases} \frac{y_L - y_R}{2} & \text{if parallel} \\ y_L - 1.8m & \text{left as Anchor} \\ y_R + 1.8m & \text{right as Anchor} \end{cases}$$

$$y_v = y$$

$$\varphi_v = \varphi$$

Figure 6:
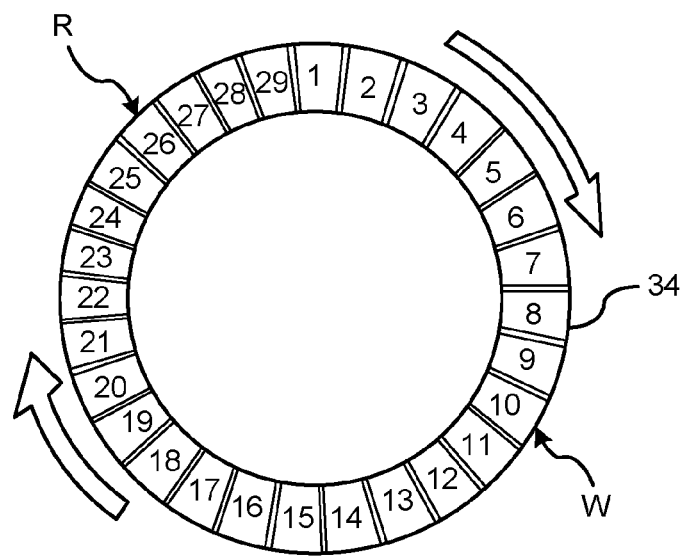
FIG. 6 is an illustration of the circular buffer.

FIG. 6 illustrates the data buffering infrastructure service. A data buffer 34 temporarily stores historical data for the vehicle state estimation technique. Preferably, the data buffer 34 utilizes a circular buffer to minimize memory cost and data consumption. As shown in FIG. 6, the data buffer 34 includes a single writer and multiple readers. The size of the buffer is pre-determined at the design stages based on the functionality required of the buffer. The functionality may include the number of parameters, the frequency of the writing, and the duration of time desired to maintain the historical data, as well as the number of readers if there is more than one reader. Maintaining the number of readers is to track when and how to update the read index. This will not affect an advance read and write index since an index is overwritten when full. The data buffer 34 utilizes two indices to indicate the data locations. The indices are as follows:

(Rindex+1) mod B=Windex→no new message; and (Windex+1) mod B=Rindex→buffer full.

When the read function catches up to the write function, then the data buffer 34 is determined to be empty. When the write function catches up to the read function, then the data buffer 34 is determined to be full. In response to the data buffer 34 being full, the write function will start overwriting indices.

Figure 7:
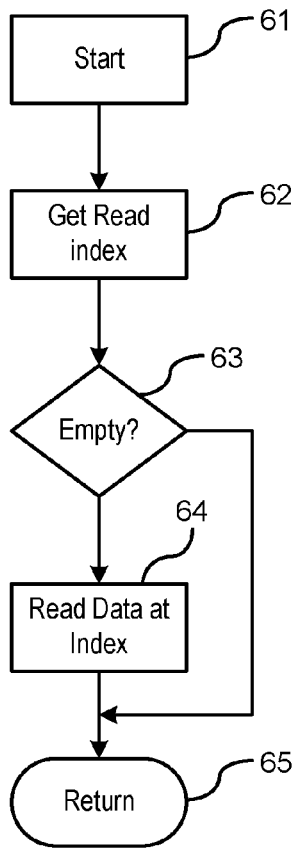
FIG. 7 is a state diagram for the read function of the buffer.
Figure 8:
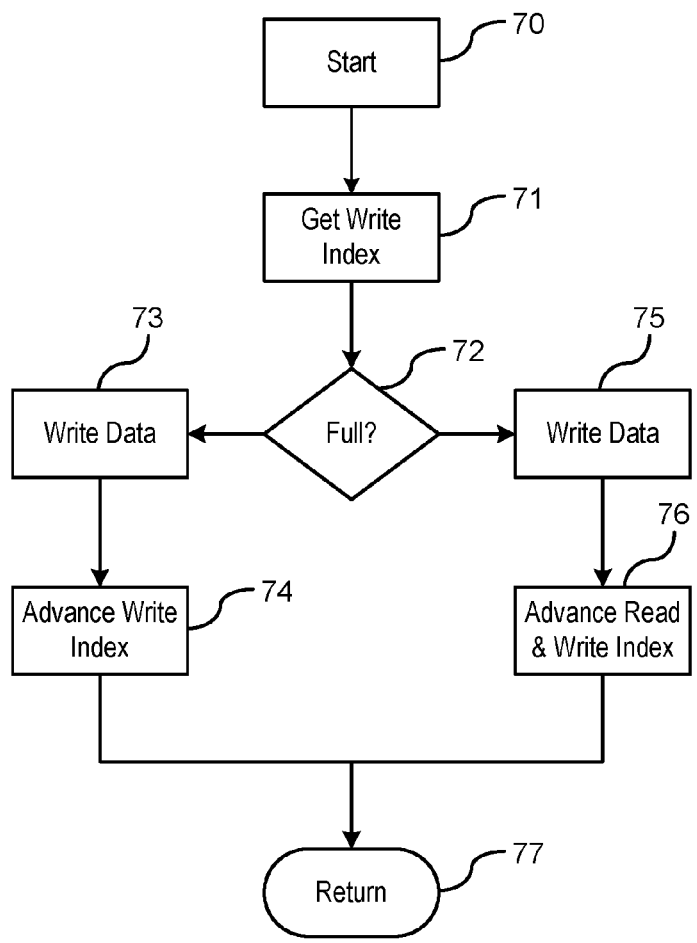
FIG. 8 is a state diagram for the write function of the buffer.

FIGS. 7 and 8 illustrate state diagrams and flow diagrams for the read/write functions. Referring to FIGS. 7, the read function is started at block 61. The routine advances to block 62 where a current index is identified.

In block 63, a determination is made as to whether the respective buffer location associated with the current index is empty. If the current index is not empty, the routine advances to block 64; otherwise, the routine advances to block 65.

In block 64, data is read at the current index, and the index is updated to the next index.

In block 65, a return is made to block 62.

FIG. 8 illustrates the write function which is initiated at block 70. In block 71, a current index is identified to write data therein.

In block 72, a determination is made whether the respective buffer location associated with the current index is full. If the respective location is not full, the routine proceeds to block 73; otherwise, the routine proceeds to step 75.

In block 73, in response to a determination that the index location is not full, data is written to the current index.

In block 74, the write index is incremented. The routine advances to block 77 and a return is made to step 71 to identify the next index for writing.

Referring again to block 72, in response to the determination that the index is full, the routine proceeds to block 75. In block 75, data is written to the current index. The routine proceeds to block 76.

In block 76, both the read index and the write index are advanced. The routine advances to block 77 and a return is made to step 71 to identify the next index for writing.

Figure 9:
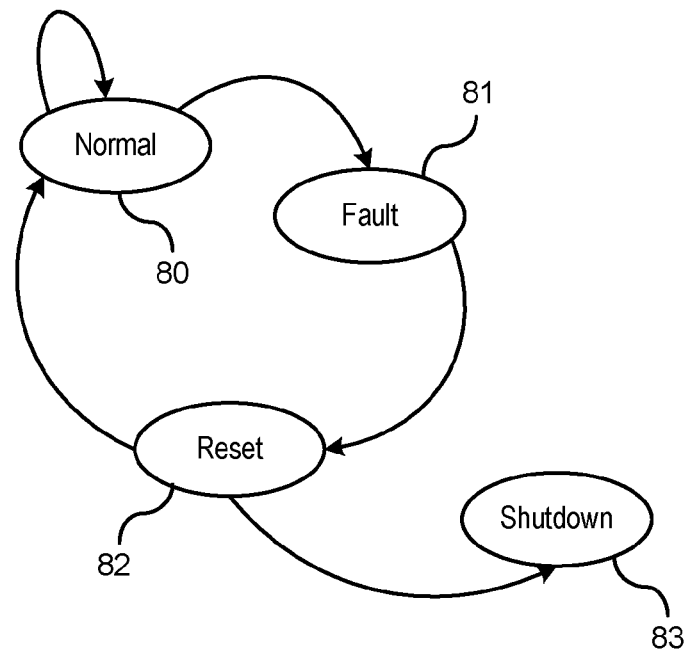
FIG. 9 is a state diagram for enabling/disabling the primary controller.
Figure 10:
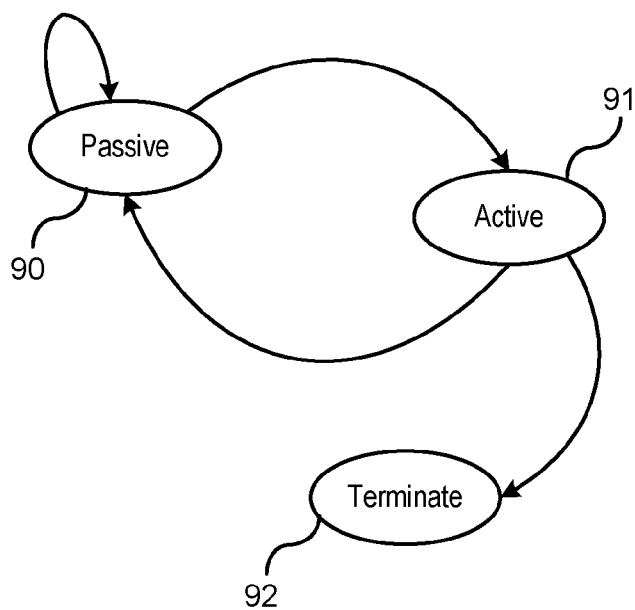
FIG. 10 is a state diagram for enabling/disabling the secondary controller.

FIGS. 9 and 10 illustrate state diagrams for a mode switch protocol for switching between the primary controller and the secondary controller. The primary function is to identify the current state of the primary controller and initiate a mode switch if the primary controller does not function correctly, and to return to a normal state if the primary controller resets successfully.

FIG. 9 illustrates the state diagram for the primary controller. In state 80, integrity function checks are performed. If the determination is made that the integrity function checks are normal, then the system broadcasts messages that the system is operating in a normal state and continues to perform functional integrity checks at predetermined instances of time.

At state 81, a fault state is entered when there is any of a functional integration fault, a data failure fault, a software failure fault, a hardware fault. In response to a detected fault, an error code is transmitted. Under a failed state, an error message is transmitted to the secondary controller, which will begin transmitting its lane fusion information to the lane centering control unit.

At state 82, the secondary controller performs a reset operation. After the reset operation, if the system successfully returns to normal, then the primary controller will transmit the message identifying that it is operating in a normal state. If the reset operation is unsuccessful such that the error in the primary controller still exists, then the system maintains the failed state and enters a shutdown state 83.

FIG. 10 illustrates a state flow diagram for the secondary controller. In state 90, while the primary controller is operating in a normal state, and in response to transmitting messages to the secondary controller that it is operating in a normal state, the secondary controller operates in a passive state. While operating in the passive state, the secondary controller constantly obtains data and performs lane fusion, but does not transmit its output to the lane change control unit.

In response to receiving an error/timeout message from the primary controller, the secondary controller enters an active state 91. Examples of faults that may occur with the primary controller that would trigger an error/timeout message would include, but are not limited to, faults in the error code, data corruption, infrastructure service fail, and functional integrity failure. While in an active state, the secondary controller transmits lane fusion output data to the lane center control module. Should the primary controller attempt to transmit data while the secondary controller is transmitting data, ongoing transmissions from the secondary controller preempts data transmitted by the primary controller.

The secondary controller maintains an active state so long as an error state message is being received regarding the primary controller. If a normal state message is received from the primary controller, the secondary controller returns to a passive state 90.

If the primary controller does not recover after a timeout, the function that is being executed by both the primary and secondary controllers is terminated at state 92. Failures detected using a timeout include controller and network failures.

While certain embodiments of the present invention have been described in detail, those familiar with the art to which this invention relates will recognize various alternative designs and embodiments for practicing the invention as defined by the following claims.

What is claimed is:

1. A lane centering data fusion system comprising:
   a primary controller determining whether a vehicle is centered within a lane of travel, the primary controller operating as a performance controller that is computationally intensive, the primary controller including a primary lane fusion unit for fusing lane sensed data for identifying a lane center position;
   a secondary controller determining whether a vehicle is centered within a lane of travel, the secondary controller operating as a high assurance controller that is less computationally intensive relative to the primary controller, the secondary controller including a secondary lane fusion unit for fusing lane sensed data for identifying the lane center position, wherein the primary controller and secondary controller are asynchronous controllers;
   a lane centering control unit maintaining the vehicle centered within the lane of travel, the lane centering control unit utilizing fusion data output from the primary controller for maintaining lane centering control, and the lane centering control unit utilizing fusion data output from the secondary controller in response to a detection of a fault with respect to the primary controller.

2. The system of claim 1 wherein the secondary controller maintains a passive state of transmitting no fusion data when no fault is detected with respect to the primary controller, and wherein the secondary controller enters an active state and transmits fusion data to the lane centering control unit when the fault is detected with respect to the primary controller.

3. The system of claim 2 wherein the lane centering unit utilizes only data transmitted by the secondary controller if both the primary and secondary controllers are both in active states transmitting data to the lane centering control unit.

4. The system of claim 2 wherein the secondary controller enters the passive state and terminates transmitting data to the lane centering control unit in response to a determination that the fault is corrected with respect to the primary controller.

5. The system of claim 2 wherein the secondary controller remains in an active state for a predetermined period of time.

6. The system of claim 2 wherein the primary controller attempts a reset when in a failed state, and wherein the secondary controller enters the passive state in response to a successful reset by the primary controller.

7. The system of claim 2 wherein the primary controller attempts a reset when in a failed state, and wherein a function monitored by the secondary controller is terminated after a predetermined period of time if the primary controller is not successfully reset after the predetermined period of time is expired.

8. The system of claim 1 wherein when the secondary controller is in the active state, the secondary controller obtains data from a buffer, the buffer storing data from the primary controller.

9. The system of claim 8 wherein the buffer includes a circular buffer of a predetermined size.

10. The system of claim 9 wherein the buffer utilizes a single writer to write data to the buffer.

11. The system of claim 10 wherein data in the buffer is overwritten in response to the buffer being full.

12. The system of claim 9 wherein the buffer utilizes multiple readers to read from the buffer.

13. The system of claim 1 wherein the fault is detected using a functional integrity check.

14. The system of claim 1 wherein the fault is detected in the primary controller in response to an error message transmitted by the primary controller.

15. The system of claim 1 wherein the fault is detected in the primary controller in response to a message timeout by the primary controller.

16. The system of claim 1 wherein the fault is detected utilizing a pattern fit comparator, wherein the pattern fit comparator utilizing historical data and patterns, and wherein a function failure can be determined if abrupt changes occur in the patterns.

17. The system of claim 1 wherein the architecture of the primary controller and the secondary controller are asynchronous.

18. The system of claim 1 wherein the primary controller and the secondary controller are integrated in a multicore controller.

19. The system of claim 1 wherein the primary controller and the secondary controller each include a monitoring module, wherein a functional synchronization of lane position and lane geometry is maintained between the primary and secondary controllers by each respective monitoring module.

20. The system of claim 1 wherein lane fusion data output by the secondary controller is applied to a Kalman filter for estimating the vehicle lateral state by modeling vehicle motion with respect to the lane center based on the lane fusion data.

* * * * *